United States Patent
Hogan et al.

(10) Patent No.: US 8,594,283 B2
(45) Date of Patent: Nov. 26, 2013

(54) PERSONALIZED ALERT INFORMATION AVAILABLE BY TELEPHONIC DEVICE

(75) Inventors: Harold Dennis Hogan, Dallas, TX (US); Matthew William Shomphe, Los Angeles, CA (US); Sivakumar Nagarajan, Los Angeles, CA (US)

(73) Assignee: Bank of America Corporation, Charlotte, NC (US)

( * ) Notice: Subject to any disclaimer, the term of this patent is extended or adjusted under 35 U.S.C. 154(b) by 966 days.

(21) Appl. No.: 12/700,955

(22) Filed: Feb. 5, 2010

(65) Prior Publication Data

US 2011/0194676 A1  Aug. 11, 2011

(51) Int. Cl.
*H04M 1/64* (2006.01)
(52) U.S. Cl.
USPC .............. 379/88.12; 379/88.11; 379/88.13; 379/88.22; 705/35; 705/44
(58) Field of Classification Search
USPC .......... 379/88.11, 88.18, 88.25, 88.12, 88.13, 379/88.22; 705/35, 44
See application file for complete search history.

(56) References Cited

U.S. PATENT DOCUMENTS

| | | | |
|---|---|---|---|
| 2007/0174448 A1* | 7/2007 | Ahuja et al. | 709/224 |
| 2010/0017619 A1* | 1/2010 | Errico | 713/186 |
| 2010/0306080 A1* | 12/2010 | Trandal et al. | 705/26.8 |
| 2010/0325047 A1* | 12/2010 | Carlson et al. | 705/44 |
| 2011/0066505 A1* | 3/2011 | Hammad | 705/14.65 |

* cited by examiner

*Primary Examiner* — Gerald Gauthier
*Assistant Examiner* — Simon King
(74) *Attorney, Agent, or Firm* — Banner & Witcoff, Ltd.; Michael A. Springs

(57) ABSTRACT

Techniques for notifying a customer of a financial institution about an alert message over a communication device are disclosed. Upon contacting an alert message center of the financial institution, the customer is presented with a notification of alert messages and may choose what action to take with respect to each alert message. The customer may respond to those issues that the customer deems important enough to warrant immediate attention without having to also sort through numerous other issues that the customer does not wish to address at the time. The alert message center collects and sorts alert messages for presentation to the customer according to various customer preferences that are updated and stored by the alert message center.

27 Claims, 7 Drawing Sheets

PERSONALIZED ALERT INFORMATION AVAILABLE BY TELEPHONIC DEVICE

FIELD

Aspects of the disclosure generally relate to mobile banking. More specifically, aspects of the disclosure relate to providing a customer with the option to receive alert message information through a communication device.

BACKGROUND

Customers of a financial institution rely on many different services provided by the financial institution to help manage various aspects of their personal and/or commercial finances. For example, customers who are required to make regular credit card payments, mortgage payments, home loan payments, and the like, often set up their bank accounts so that such payments may be automatically made on or before the date they become due. Many customers also utilize various financial services for investment and savings purposes, such as Individual Retirement Accounts (IRAs), college savings plans, or standard brokerage accounts.

With the tremendous rise in the number of customers who regularly engage in online banking has come an increased demand from customers for simple and efficient ways to stay informed about various financial activities and changes associated with their customer accounts. As a result, many financial institutions now provide some variation of an alert notification system, in which a customer of a financial institution is alerted when a particular event or activity occurs with respect to the customer's account, credit card or other related financial matters.

Despite the advent of known alert notification systems deployed by many financial institutions, many customers find such alerts to be irritating and time-consuming, especially if the customer has little or no interest in the subject matter or issue that spurred the generating of the alert in the first place. Instead, customers prefer to receive alert messages from their associated financial institutions when it is most convenient for the customers. Furthermore, customers often prefer to receive only those alert messages that they find to be valuable, and not be required to sort through additional alert messages they deem unimportant or irrelevant.

BRIEF SUMMARY

The following presents a simplified summary of the disclosure in order to provide a basic understanding of some aspects herein that allow for providing alert messages to a customer (e.g., client, customer, service purchaser, user, and the like) via a telephonic device. It is not intended to identify key or critical elements of the disclosure or to delineate the scope of the disclosure. The following summary merely presents some concepts of the disclosure in a simplified form as a prelude to the more detailed description provided below.

One or more aspects described herein relate to providing a customer with a notification of alert messages when the customer initiates communication with an alert message center. The alert message center presents the customer with the notification of alert messages and queries the customer as to what action the customer wishes to take with respect to the alert messages. For example, the customer may elect to receive, ignore, save, or delete the alert messages, or different combinations or variations thereof (e.g., receive the alert messages and also save the alert messages for a select period of time for later retrieval), depending on the particular preferences of the customer. Thus, the customer can respond to those issues that the customer deems important enough to warrant immediate attention without having to also sort through numerous other issues that the customer does not wish to address at the time.

According to another aspect described herein, the alert message center collects and sorts alert messages from various alert message engines for presentation to the customer. The alert message center collects and sorts the alert messages according to various customer settings (e.g., preferences, properties, settings, conditions, and the like) that are updated and stored by the alert message center for later retrieval when the customer is again presented with a notification of alert messages.

According to another aspect described herein, the customer may modify the alert message settings stored in and used by the alert message center. When a customer contacts the alert message center, in addition to or instead of receiving alert messages, the customer may elect to modify the alert message settings currently in place for collecting and presenting alert messages to the customer. The customer may select a particular alert message setting, and by adjusting the parameters of that setting, modify the setting according to the customer's preferences. For example, if the customer wishes to receive collected alert messages in a particular order, such as bill pay alert messages first and promotional alert messages last, then the customer may adjust the "Presentation Order" parameter of the "Receiving Alert Messages" setting.

According to another aspect described herein, the customer's interactions with the alert message center are tracked to make future communications with the alert message center more personalized and efficient for the customer. The notification of alert messages presented by the alert message center to the customer is modified according to collected data relating to the customer's previous interactions with the alert message center.

Aspects of the disclosure may be provided in a computer-readable medium having computer-executable instructions to perform one or more of the process steps described herein.

These and other aspects of the disclosure are discussed in greater detail throughout this disclosure, including the accompanying drawings.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown by way of illustration various embodiments in which one or more aspects of the disclosure may be practiced. It is to be understood that other embodiments may be utilized and structural and functional modifications may be made without departing from the scope of the present disclosure.

By way of general introduction, aspects of the disclosure relate to providing alert messages to users of information systems of financial institutions. Alert messages include automatic messages generated for presentation to a user regarding an event applicable to the user and/or the user's account with the financial institution, e.g., checking, savings, loan, credit, and the like. Examples of alert messages might include a message indicating to the user that a most recent payment of $100.00 was received on Nov. 12, 2009; that a current mortgage payment is past due; that an online bill payment was scheduled in the amount of $14.37 to a given company; or any other information the information system determines might be of relevance or importance to the user.

For example, users who call customer service agents at a mortgage company most often are calling to inquire whether a mortgage payment has been received by the mortgage company. According to aspects described herein, a system might prioritize an alert message indicating that a mortgage payment was recently received, thereby obviating the need for the customer to speak with a customer service representative. However, because other alert messages might also be ready and waiting to be presented to the caller, e.g., indicating a promotional rate for refinancing a mortgage, or indicating that someone recently changed the phone number associated with the user's account, aspects described herein may be used to prioritize and order alert messages, and provide the user more control over when and how alert messages are provided.

Figure 1:
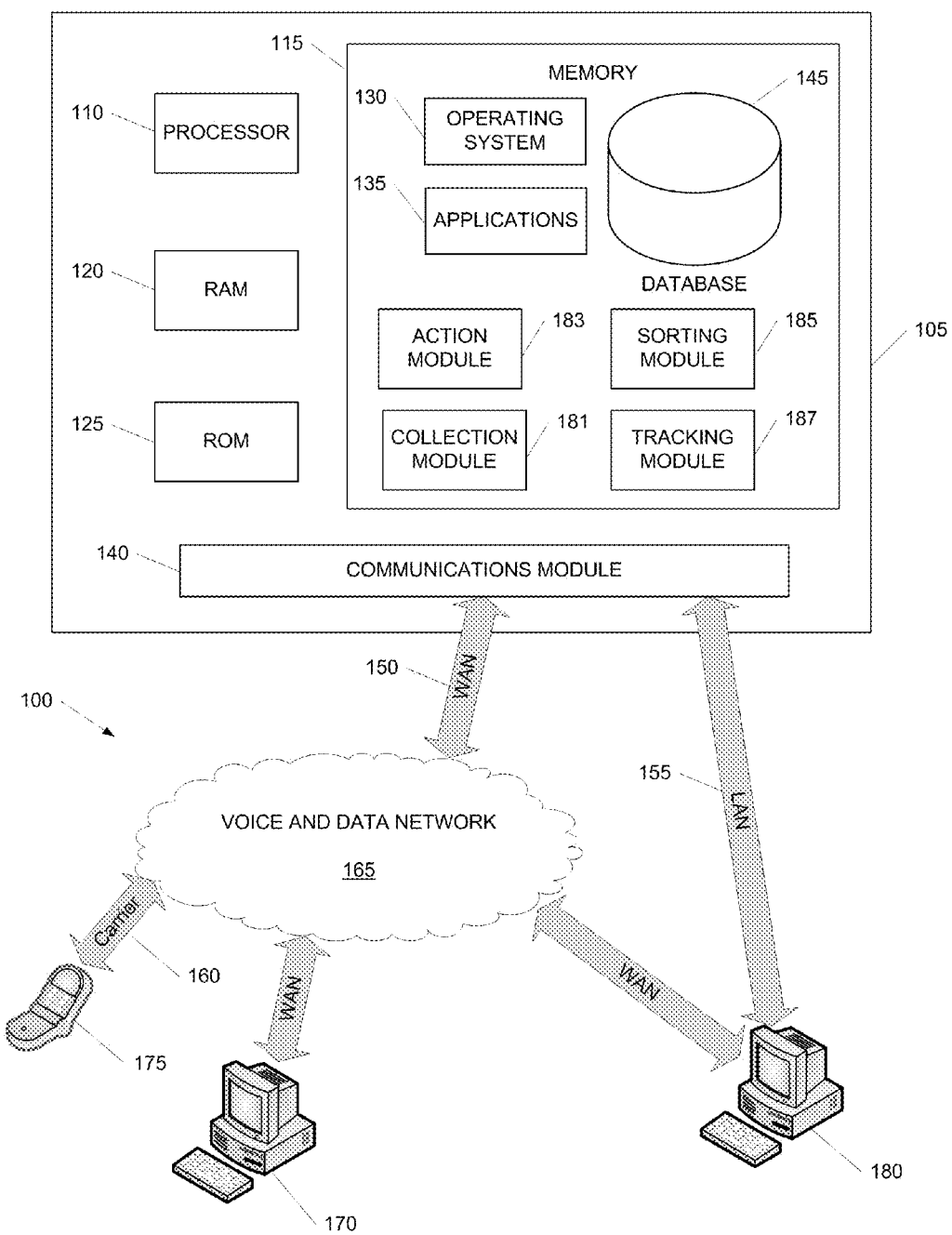
FIG. 1 illustrates an example operating environment in which various aspects described herein may be implemented.

FIG. 1 illustrates a block diagram of a generic computing device 105 (e.g., an alert message center) in computing environment 100 that may be used according to an illustrative embodiment of the disclosure. The alert message center 105 may have a processor 110 for controlling overall operation of the center and its associated components, including random access memory (RAM) 120, read-only memory (ROM) 125, communications module 140, and memory 115.

Communications module 140 may include input and output devices and/or modules, e.g., a microphone, mouse, keypad, touch screen, scanner, optical reader, and/or stylus (or other input device(s)) through which an operator of alert message center 105 may provide input, and may also include one or more of a speaker for providing audio output and a video display device for providing textual, audiovisual and/or graphical output. Communications module 140 may further be configured to provide the alert message center 105 with receiving and transmission capabilities. Alert message center 105 may, for example, receive data about alert messages from various alert message engines associated with alert message center 105, such as bill payment or account management applications of a financial institution. Alternatively or additionally, alert message center 105 may receive alert message data from other sources with which alert message center 105 is also associated, such as financial institution survey databases where, for example, information related to customer satisfaction may be collected or stored. Alert message center 105 may similarly transmit alert message data (e.g., to a customer) using communication module 140. Software may be stored within memory 115 and/or other storage to provide instructions to processor 110 for enabling alert message center 105 to perform various functions. For example, memory 115 may store software used by the alert message center 105, such as an operating system 130, application programs 135, and an associated database 145. Database 145 may be configured to store a variety of information such as application program data, customer preference data, alert message data, and the like. Alternatively, some or all of alert message center 105 computer executable instructions may be embodied in hardware or firmware (not shown).

Alert message data may be collected from different sources, such as various alert message engines, by a collection module 181 that may be configured to survey or be pinged by the alert message engines for alert message activity and generate a collective list of alert messages as described in further detail herein. Alert message relevance and importance may be determined by an action module 183. For example, action module 183 may be configured to calculate an alert message weight based on different actions on that alert message by the customer and/or by other members of the customer's financial institution. In calculating an alert message weight, action module 183 may further be configured to include actions on the same or similar alert messages by customers of other financial institutions. A sorting module 185 may be configured to sort or filter the collected alert messages based on a certain relevance or interest weight. Calculating alert message weight and sorting of alert messages are described in further detail herein.

Further, in one or more configurations, memory 115 of alert message center 105 may include a tracking module 187 that may be configured to track customer interactions with alert messages when presented to a customer and interpret those interactions as signaling interest or non-interest in various alert messages. Such customer interactions may be interpreted by tracking module 187 to collect additional data that may be relevant to action module 183 in calculating a weight for a particular alert message. For example, tracking module 187 may detect a customer's interaction with a promotional alert message related to refinancing options. Based on the customer's interaction, tracking module 187 may determine that the customer either has a strong interest or no interest in refinancing options, which is data that action module 183 may use to determine a weight for similar alert messages collected in the future. Additionally or alternatively, tracking module 187 may determine that the customer is interested or disinterested in a broader category of alert messages with which the particular alert message is associated, such as sales and promotional alert messages. Tracking module 187 may have the flexibility to interpret multiple types of interactions in a variety of ways. Tracking of customer interactions is also described in further detail below.

Alert message center 105 may operate in a networked environment supporting connections to one or more remote computers, such as terminals 170 and 180. The terminals 170 and 180 may be personal computers or servers that include many or all of the elements described above relative to the alert message center 105. The network connections depicted in FIG. 1 include a local area network (LAN) 155 and a wide area network (WAN) 150, but may also include other networks. When used in a LAN networking environment, alert message center 105 may be connected to LAN 155 through a network interface or adapter in communications module 140. When used in a WAN networking environment, alert message center 105 may include a modem in communications module 140 or other network interface for establishing communications over WAN 150, such as Voice and Data Network 165. It will be appreciated that the network connections shown are illustrative and other means of establishing a communications link between the remote computers may be used. The existence of any of various well-known protocols such as TCP/IP, Ethernet, FTP, HTTP, HTTPS, SIP and the like is presumed. Alert message center 105 may also operate in mobile terminal 175 (e.g., mobile phones, PDAs, notebooks, and the like) communicating over wireless carrier channel 160 and include various other components, such as a battery, speaker, and antennas (not shown).

The disclosure is operational with numerous other general purpose or special purpose computing system environments or configurations. Examples of well known computing systems, environments, and/or configurations that may be suitable for use with the disclosure include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The disclosure may be described in the general context of computer-executable instructions, such as program modules, being executed by one or more computers and/or one or more processors associated with the computers. Generally, program modules include routines, programs, objects, components, data structures, and the like that perform particular tasks or implement particular abstract data types. Aspects of the disclosure may also be practiced in distributed computing environments where tasks are performed by remote processing devices that are linked through a communications network. In a distributed computing environment, program modules may be located in both local and remote computer storage media including memory storage devices.

The system, devices and networks of FIG. 1 may, in one or more arrangements, be used to provide alert message notification functionality. Alert messages are used to keep customers of, for example, a financial institution informed about various activities occurring within, affecting, or otherwise related to their financial accounts and business. For example, an alert message may be used to inform a customer that an automatic bill payment has been sent or received by the customer's financial institution. The automatic bill payment may be a payment that the customer previously scheduled, a payment that is part of a recurring bill payment plan, a payment that was sent in error by the financial institution, a payment received against a line of credit or outstanding loan, or the like. Accordingly, by receiving the alert message, the customer is empowered to take appropriate, and in some instances corrective action if the customer wishes to do so.

Figure 2:
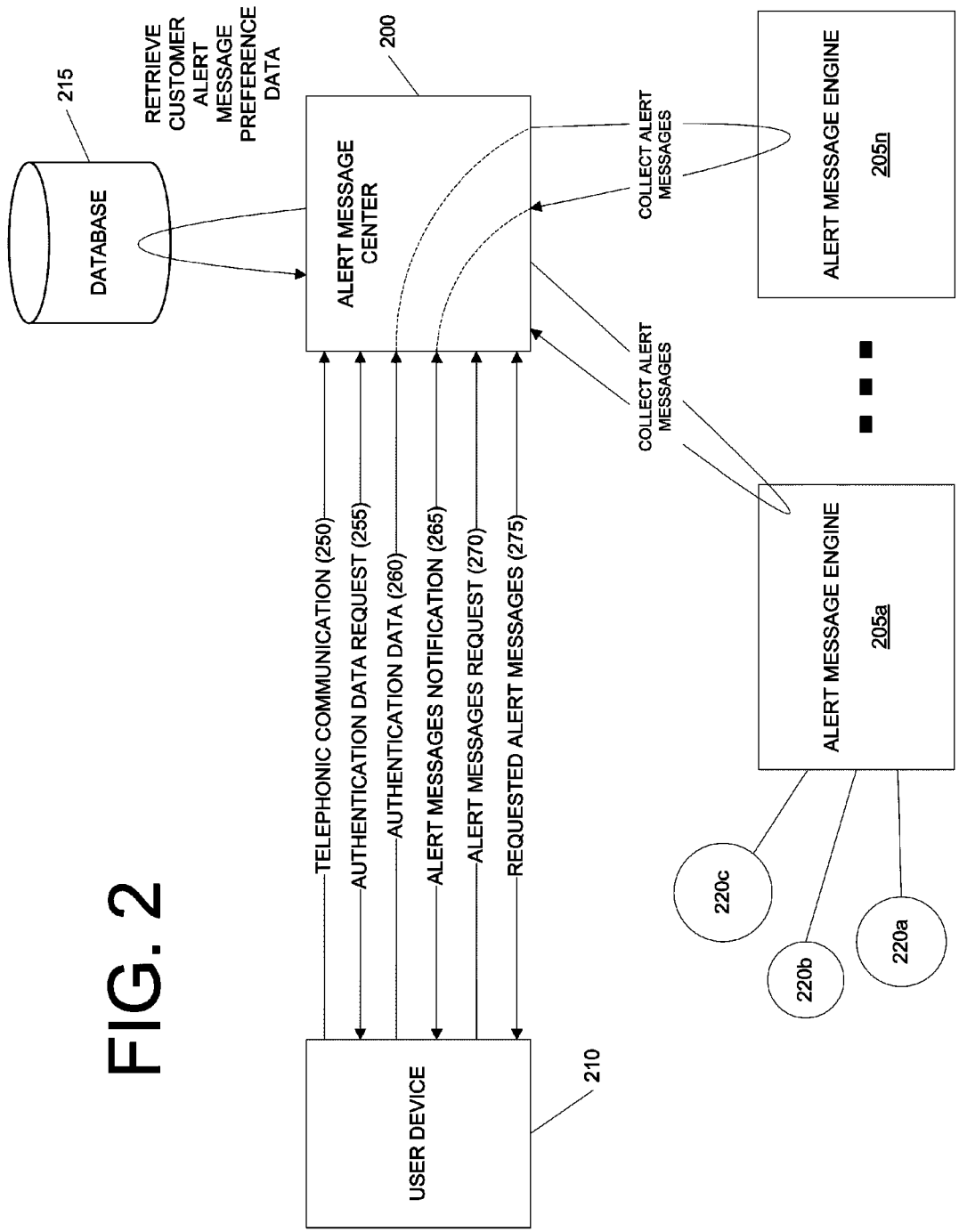
FIG. 2 illustrates an example data flow diagram for presenting alert messages to a customer according to one or more aspects described herein.

FIG. 2 illustrates a data flow of alert message information and data between an alert message center 200 (e.g., center 105 of FIG. 1), an alert message engine 205 and a user device 210. As illustrated, alert message center 200 may obtain alert messages for a customer from one or more of a plurality of alert message engines 205. An alert message engine, e.g., alert message engine 205*a*, may be associated with or connected to multiple different financial services applications 220. Each financial services application, e.g., financial services application 220*a*, may generate and maintain data related to one or multiple types of financial activity. For example, an online bill payment service may contain data on bill payments made from customer checking accounts. Other types of financial services applications may include mortgage processing, credit card accounts, and the like. Alert message engine 205 may generate an alert message for a customer based on such data, which alert message center 200 may collect for inclusion in a notification of alert messages to the customer. Alert message engine 205 may generate a separate alert message each time a particular activity occurs, or may generate a single alert message containing summary data about multiple identical or similar activities occurring within a certain period of time. Alert message engine 205 may additionally, or alternatively, generate alert messages in various other ways, such as in response to certain identified patterns of financial activity or according to a temporary or permanent set of customer preferences.

In response to accepting an incoming telephonic communication 250 from a user device 210, alert message center 200 may transmit back to the user a request 255 for authentication data to identify the user as a customer of the financial institution with which alert message center 200 is associated. For example, alert message center 200 may request that the user input a social security number, an account number, a username and personal identification number (PIN), a date and amount of the most recent transaction, or other such customer validation/authentication information or combination thereof. Alert message center 200 may transmit multiple or successive requests 255 for authentication data to the user or may request or obtain authentication data through a variety of additional or alternative means other than the illustrative examples described above.

As illustrated, alert message center 200, upon receiving customer authentication data 260 from a user of user device 210, may collect alert messages from an alert message engine 205. The alert messages may be collected from any number of a plurality of alert message engines 205, which may contain alert messages for the customer generated by alert message engines 205 in response to data from one or multiple financial services applications 220 connected thereto as described above. For example, alert message center 200 may collect alert messages for a customer from an alert message engine 205 that generates alert messages for activity related to the customer's credit card usage over the Internet. Alert message center 200 may also collect alert messages from an alert message engine 205 that generates alert messages that are not specific to the authenticated customer. For example, alert message engine 205 may generate alert messages for all customers of the associated financial institution who are enrolled in an online banking rewards program, or who have outstanding student loans, mortgage payments, or the like.

Because alert message center 200 may collect a large number of alert messages for a customer from alert message engines 205, according to one or more aspects of the disclosure, alert message center 200 may retrieve the customer's alert message preferences (e.g., the customer's preferred settings for collecting and presenting alert messages) from a database 215 to customize notification 265 of the alert messages to the customer. For example, rather than presenting a customer with notification 265 of all collected alert messages, only a fraction of which the customer is interested in receiving, alert message center 200 may sort the collected alert messages according to the customer's preferred settings stored in database 215 so that notification 265 to the customer only includes those alert messages that the customer finds value in receiving. Sorting alert messages based on customer preferences is described in further detail herein.

In response to receiving a notification 265 of alert messages, a customer of user device 210 may send a request 270 to receive the alert messages from alert message center 200. The request 270 may be a request to receive any number of the alert messages presented in notification 265, and may be a request to receive the alert messages in any particular order. Additionally, a customer may receive multiple or repeated notifications 265 of the same alert messages, and, similarly, may make multiple or repeated requests 270 to receive the same alert messages. As described in further detail herein, notification of, and requests to receive alert messages may be modified in various other ways in addition to or instead of the illustrative examples provided above. In response to receiving a request 270 for alert messages, alert message center 200 may send requested alert messages 275 to the requesting customer.

Figure 3:
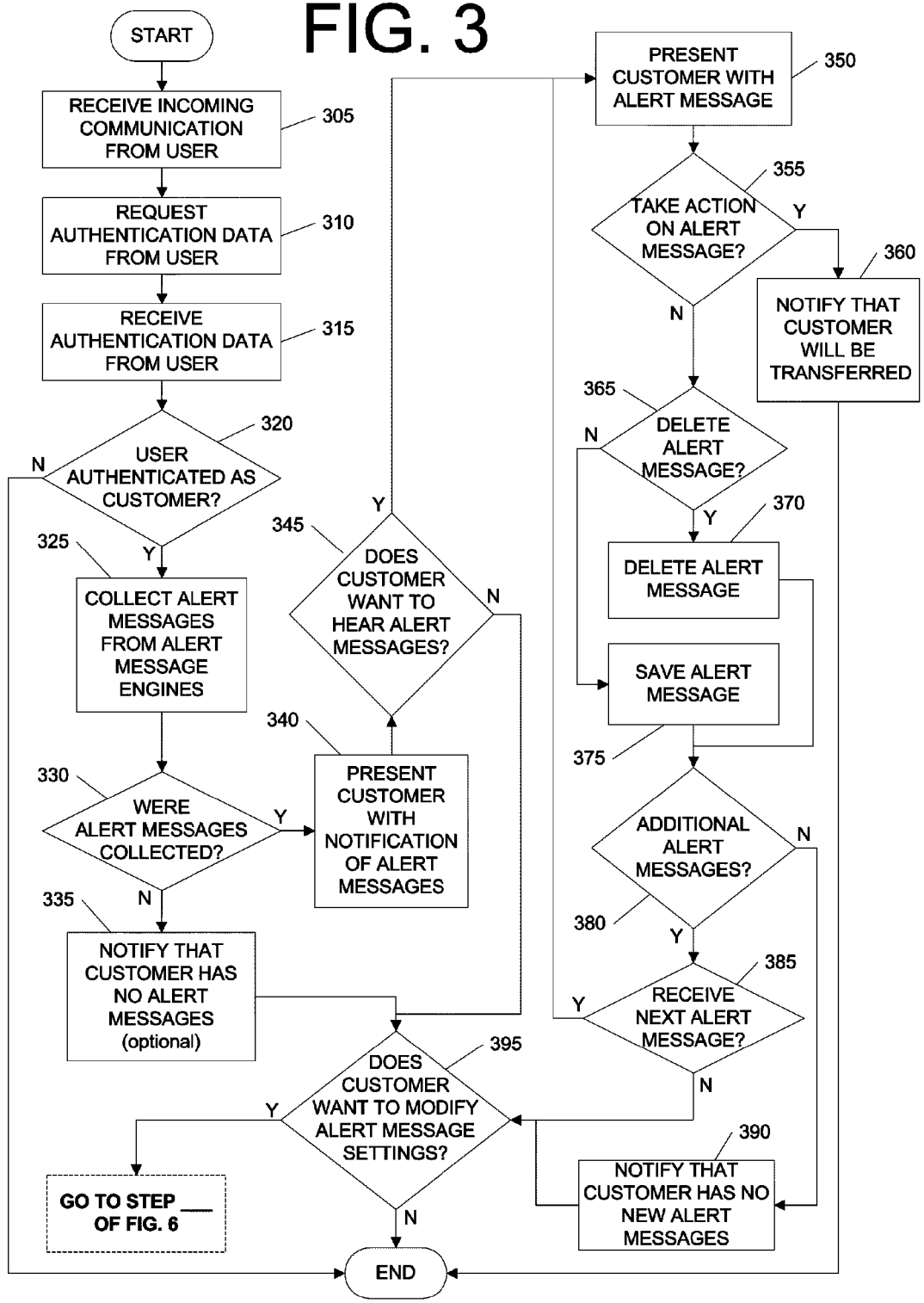
FIG. 3 is a flowchart illustrating an example method for presenting a customer with alert messages according to one or more aspects described herein.

FIG. 3 illustrates a method of presenting a customer with alert messages according to one or more aspects described herein. In step 305 an alert message center (e.g., center 105 of FIG. 1) may receive or accept an incoming communication from a user. For example, a user of a mobile communication device (e.g., mobile terminal 175 in FIG. 1) may place a call to a financial institution that is received (i.e., answered) by the alert message center. Upon receiving the incoming communication from the user, in step 310 the alert message center may request authentication data from the user to authenticate the user as a customer of the financial institution with which the alert message center is associated. A request for authentication data may include, for example, a request that the user input certain items of identification, such as a social security number, a date of birth, a username and personal identification number (PIN), and the like. Additionally or alternatively, a request for authentication data may include a request that the user input information related to the user's relationship with the financial institution, such as an account number, a date and amount of the most recent transaction, a current balance on an existing account or other such customer validation/authentication information or combination thereof.

In step 315, the alert message center may receive authentication data from the user, which the alert message center may then use to determine whether the user is a valid customer of the financial institution in step 320. For example, the alert message center may compare the authentication data received from the user against existing customer data stored by the financial institution. The alert message center may be configured to authenticate a user based on a particular degree of comparison between the received and stored authentication data, a range of degrees of comparison, or other similar comparison thresholds. A variety of other authentication techniques may be used in addition to or in place of the illustrative comparison technique described above.

If the user is authenticated as a customer of the financial institution in step 320, then in step 325 the alert message center may collect alert messages for the customer from various alert message engines (e.g., alert message engine 205a in FIG. 2) that generate alert messages in response to activities occurring within or otherwise affecting the customer's accounts or financial matters handled by the financial institution. In step 330, the alert message center determines whether any alert messages for the customer were collected from the alert message engines. In one example, alert messages may be generated by the alert message engines only in response to certain types or frequent occurrences of events or activities, which may vary between customers of the financial institution depending on a number of different factors. For example, a customer who has conducted business with the financial institution for an extended period of time (e.g., twenty or more years) may have predictable account activity patterns that are recognized by various alert message engines as not being cause to generate alert messages. On the other hand, for a customer who only recently opened an account with the financial institution, the alert message engines may generate alert messages in response to activities or events that would otherwise be passed over as normal or unimportant with regard to a customer who has an established relationship with the financial institution. If the alert message center determines in step 330 that no alert messages were collected, then in step 335 the alert message center may notify the customer that there are no alert messages for the customer at that time.

If, in step 330, the alert message center determines that alert messages were received from the alert message engines, then in step 340 the alert message center presents the customer with a notification that the customer has alert messages. For example, with reference to FIG. 4, the alert message center may present the customer with a notification 400 that "You have alert messages." Various alternative presentation formats may be used to notify the customer of alert messages, and the language or phrasing of the notification is in no way limited to that used in notification 400 illustrated in FIG. 4. Additionally, as described in further detail herein, the notification to the customer of alert messages may be modified according to the customer's preferences and/or other interactions with the alert message center.

Figure 4:
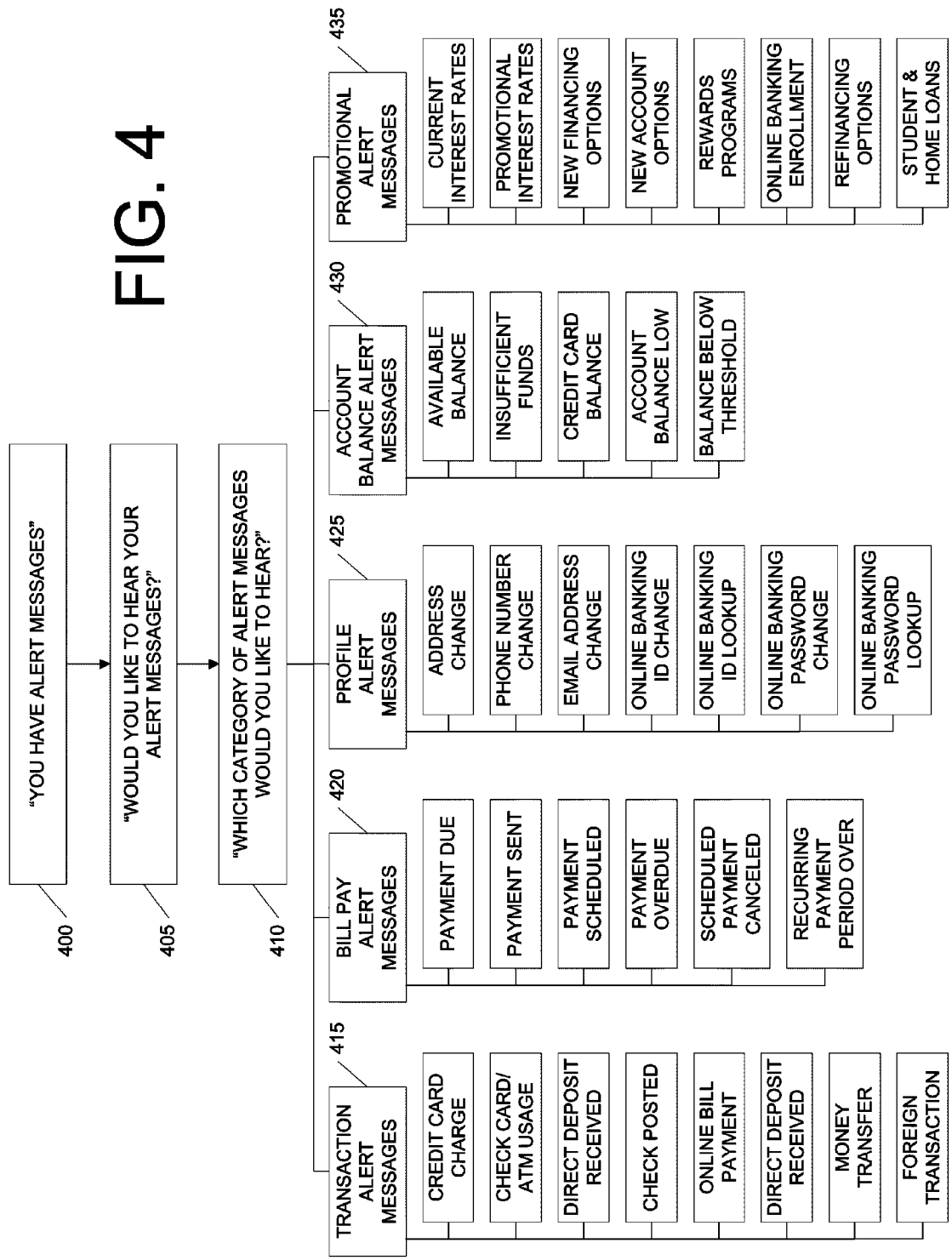
FIG. 4 illustrates an example menu structure for presenting alert messages to a customer according to one or more aspects described herein.

In step 345 the alert message center may query the customer as to whether the customer wishes to hear the alert messages presented to the customer in step 340. For example, again with reference to FIG. 4, after presenting the customer with a notification of alert messages, the alert message center may present the customer with a query 405 of "Would you like to hear your alert messages?" As with notification 400, the query presented to the customer in step 345 may be in a variety of formats alternative to that used in query 405. If, in response to the query presented in step 345, the customer does not want to receive any of the alert messages, then the process ends. However, if the customer does want to receive alert messages, then in step 350 the alert message center presents the customer with a selected alert message. The customer may select to receive any of the various alert messages that were presented to the customer in the notification of step 340. For example, as illustrated in FIG. 4, a customer may select to receive transaction alert messages 415, bill pay alert messages 420, profile alert messages 425, account balance alert messages 430, and promotional alert messages 435. Additional or alternative categories and types of alert messages may be available to or selected by a customer other than the illustrative examples described in FIG. 4. Further, as described in more detail herein, the alert message center may personalize or customize the presentation of alert messages to a customer by, for example, modifying the presentation order according to the customer's preferences.

After presenting the customer with an alert message, in step 355 the alert message center queries the customer as to whether the customer wants to take action with respect to the presented alert message. For example, if, in step 350 the customer is presented with an alert message that a bill payment is overdue, then the customer may desire to take appropriate corrective action by making the overdue bill payment. In step 355 the alert message center offers the customer the opportunity to do so. If the customer does wish to take action in response to receiving an alert message, then in step 360 the alert message center may notify the customer that the customer will be transferred to a representative of the financial institution. The alert message center may respond in additional or alternative ways in step 360 when a customer wishes to take action on an alert message. For example, the alert message center may be configured to allow the customer to take action on an alert message by presenting a series of queries to the customer, requesting the customer to input items of data related to the subject matter of the alert message, or any combination thereof. The alert message center may also be configured to allow the customer to take action on an alert message through a combination of automated services and real-time representative assistance.

In step 365, the alert message center queries the customer as to whether the received alert message should be deleted as an alert message. If the customer does not wish for the received alert message to again be included in the notification of alert messages presented to the customer in step 340, then the alert message may be deleted by the alert message center in step 370. However, in step 375 the alert message center may save the received alert message as an alert message that the alert message center will include in a subsequent notification to the customer of alert messages. For example, if a customer, upon receiving an alert message, does not want to take action on the alert message at that time, but does want to take action on the alert message at some later time, then the alert message center may save the alert message so that the customer is reminded about the alert message the next time the customer contacts the financial institution.

In step 380, the alert message center determines whether there are additional alert messages (other than alert message saved in step 375) that were collected for and included in the notification to the customer. If no alert messages remain for the customer, then the alert message center notifies the customer of such in step 390 and the process continues to step 395 where the customer is given the opportunity to modify the alert message settings currently being used by the alert message center in servicing the customer. If the customer does not want to modify alert message settings, then the process ends. However, if the customer does want to modify alert message settings, then the process continues to step 630 in the example method for modifying alert message settings illustrated in FIG. 6. Modifying alert message settings is described in further detail herein. Referring again to FIG. 3, if the alert message center determines that alert messages remain for the customer in step 380, then in step 385 the alert message center queries the customer as to whether the customer wishes to receive the next alert message. If the customer does wish to receive the next alert message, then the process repeats at step 350 with the alert message center presenting the customer with the next alert message. If, at step 385, the customer does not wish to receive the next alert message, then the process continues to step 395 where the customer is queried as to whether the customer wants to modify alert message settings.

Figure 5:
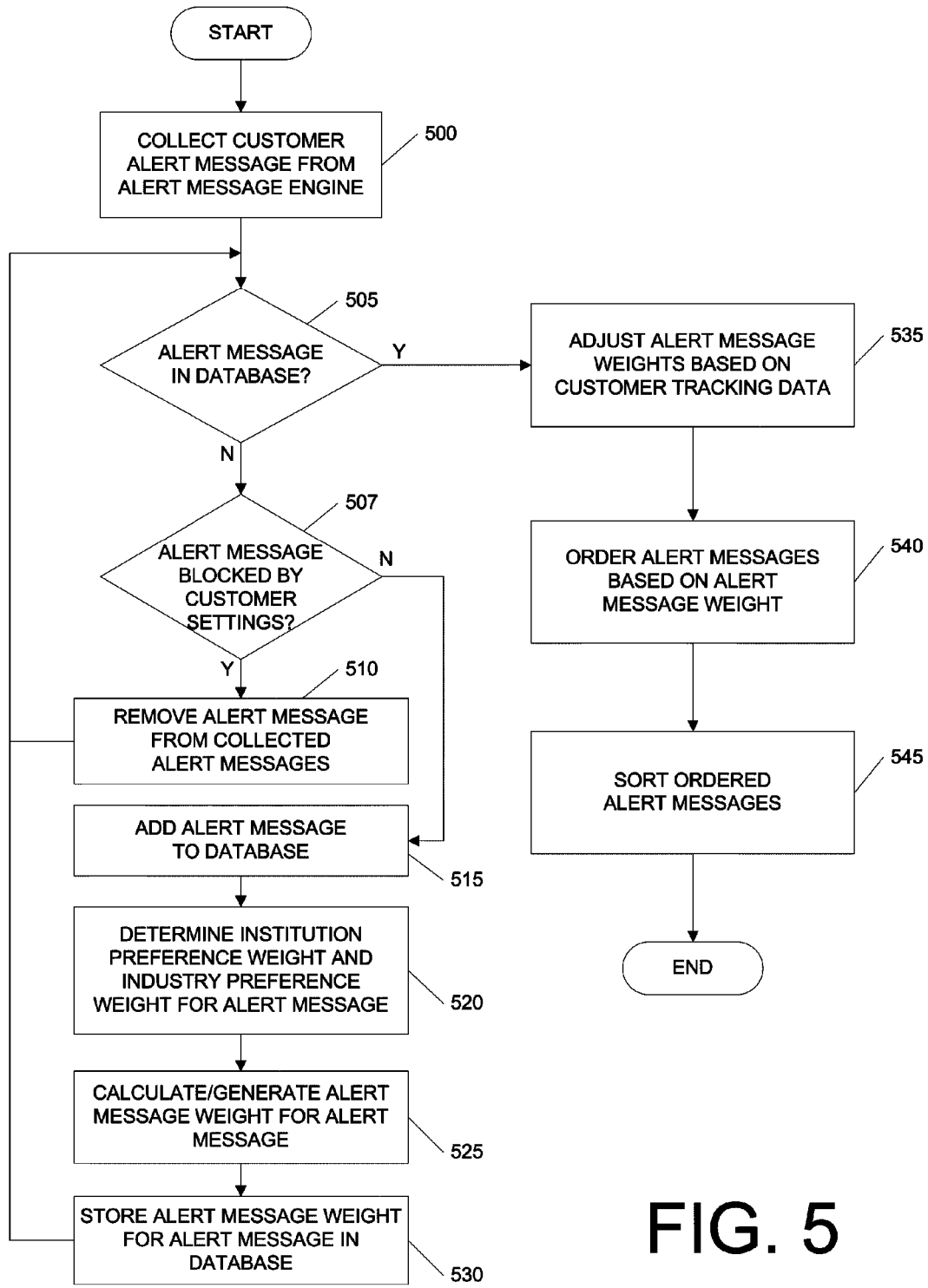
FIG. 5 is a flowchart illustrating an example method for collecting and sorting alert messages based on customer preferences according to one or more aspects described herein.

FIG. 5 illustrates an example method for collecting and sorting alert messages according to one or more aspects described herein. In step 500, a collection module (e.g., collection module 181 of FIG. 1) of an alert message center may survey multiple alert message engines and generate a collective list of alert messages for a customer. The list of alert messages may include, for example, any combination of the various alert messages illustrated in FIG. 4, such as alert messages that a scheduled bill payment has been canceled, the customer's online banking password has been changed, the customer has received a direct deposit into an account, and the like. In step 505, the collection module may determine whether the alert messages collected include an alert message that does not yet exist for the customer in an alert message database of the alert message center. If so, in step 507 the collection module may check whether the particular alert message is blocked by the customer's alert message settings. For example, if the customer does not wish to be notified of promotional alert messages, then the customer's alert message settings may be configured such that promotional alert messages are not collected for inclusion in the notification of alert messages presented to the customer. A customer's alert message settings and, more specifically, modifying a customer's alert message settings are described in further detail herein. If it is determined in step 507 that the alert message is blocked by the customer's settings, then in step 510 the alert message is removed from the group of alert messages collected in step 500 and the process reverts back to step 505. However, if in step 507 it is determined that the alert message that does not yet exist in the database is also not blocked by any of the customer's settings, then the alert message may be added to the database in step 515. In one example, the alert message may be added to the database to allow the alert message center to track the customer's future interactions with respect to the alert message. Once added to the database, the alert message may be tracked by a tracking module (e.g., tracking module 187 of FIG. 1) of the alert message center, which may be configured to track the customer's interactions with the alert message when subsequently presented to the customer and interpret those interactions as signaling interest or non-interest in the alert message.

In step 520, an action module (e.g., action module 183 of FIG. 1) may determine an institution preference weight and an industry preference weight for the alert message added to the database in step 515, which may be used to calculate an overall alert message weight in step 525, as described in further detail herein. The action module, in step 520, may determine an institution preference weight for the alert message based on data related to the preferences of other customers of the associated financial institution with respect to the alert message. In one example, an institution preference weight may be determined by calculating the percentage of customers of the financial institution who, within a period of time, have elected to receive the alert message upon being notified of the alert message. Thus, if within the last six months, 400 customers of the financial institution were presented with a notification of the particular alert message, and 240 of those customers elected to receive the alert message, then that alert message may have an institution preference weight of 0.6 (i.e., 240÷400).

In one example, industry preference weight for the alert message may be determined in a similar fashion as institution preference weight by calculating the percentage of customers of a number of other non-associated financial institutions who, within a period of time, have elected to receive the alert message upon being notified of the alert message. This percentage may be calculated based on cumulative data, meaning the total number of customers of other financial institutions who elected to receive the alert message is divided by the total number of customers who were notified of, but did not elect to receive, the alert message. Alternatively, the percentage may be determined by averaging the percentages, as calculated above, of a number of other financial institutions. It is appreciated that both institution and industry preference weights may be determined in a variety of other ways, such as data that has already been collected through surveys or other computational mechanisms. Additionally, the period of time that institution and industry preference weights are based upon is flexible, and may include a variety of different of time periods.

In step 525, the alert message center may calculate or generate an alert message weight for the alert message added to the database in step 515 by combining the institution and industry preference weights determined in step 520. The alert message weight may be calculated in any number of ways using the institution and industry preference weights. For example, if the associated financial institution deems one of the preference weights more or less important or accurate than the other, then that preference weight may be scaled before it is used to calculate the alert message weight. In step 530, the calculated alert message weight is stored in the database along with the added alert message for subsequent use by a sorting module of the alert message center, as described in further detail herein.

Once the alert message weight has been stored in the database in step 530, the process may revert back to step 505 where the collection module may again determine whether the alert messages collected include an alert message that does not yet exist for the customer in the alert message database of the alert message center. If so, steps 507 through 530 are repeated. However, if the collection module determines in step 505 that all collected alert messages are stored in the alert message database, and thus each has an alert message weight associated with it, the process may proceed to step 535 where the weights of the alert messages may be adjusted according to customer tracking data collected by a tracking module of the alert message center. Customer tracking data may, for example, include various multipliers that are recorded and stored by the tracking module for each occurrence of a customer interacting with the alert message center. For example, if, after being presented with a notification of alert messages (e.g., as in step 340 in FIG. 3), a customer elects to ignore alert message "XYZ," then the tracking module may record and store a multiplier of ¾ for that particular occurrence of the customer ignoring alert message XYZ. Accordingly, the next time alert message XYZ is collected by the collection module, then in step 535, the weight of alert message XYZ may be multiplied by ¾ to reflect the level of importance or relevance that the customer finds in alert message XYZ. A multiplier of ¾ may be recorded and stored for each occurrence of the customer ignoring alert message XYZ when presented to the customer in a notification, and thus in step 353, the weight of alert message XYZ may be adjusted by a multiple of ¾, the multiple reflecting the number of occurrences where the customer ignored the alert message (e.g., after the first occurrence the alert message weight is multiplied by (1)(¾); after the second occurrence by (¾)(¾); and so on). For each occurrence of the customer selecting to hear an alert message, the tracking module may record and store a different multiplier (e.g., 1.5) to be used in adjusting the weight of the associated alert message in a manner similar to that described above. Tracking data collected by the tracking module may be used in alternative or additional ways to adjust the weights of alert messages in step 535 other than the illustrative example of adjusting weights described above. Tracking data collected by the tracking module may alternatively be used in later steps in the process illustrated in FIG. 5.

In step 540, the collection module may order the alert messages according to their determined and adjusted alert message weight. For example, if a larger alert message weight corresponds to a greater customer preference, the collection module may order the collected alert messages from largest weight to smallest weight. In one or more arrangements, if a threshold alert message weight has been set for collected alert messages, then in step 545, a sorting module may sort those alert messages with weights at or above the set threshold from those alert messages with weights below the set threshold. Alert messages with weights below the set threshold may be filtered out of the collected alert messages before the collected alert messages are included in the notification to be presented to the customer. Other weighting algorithms may be used that automatically prioritize or de-prioritize one or more messages based on automatic analysis of prior user behavior.

Figure 6:
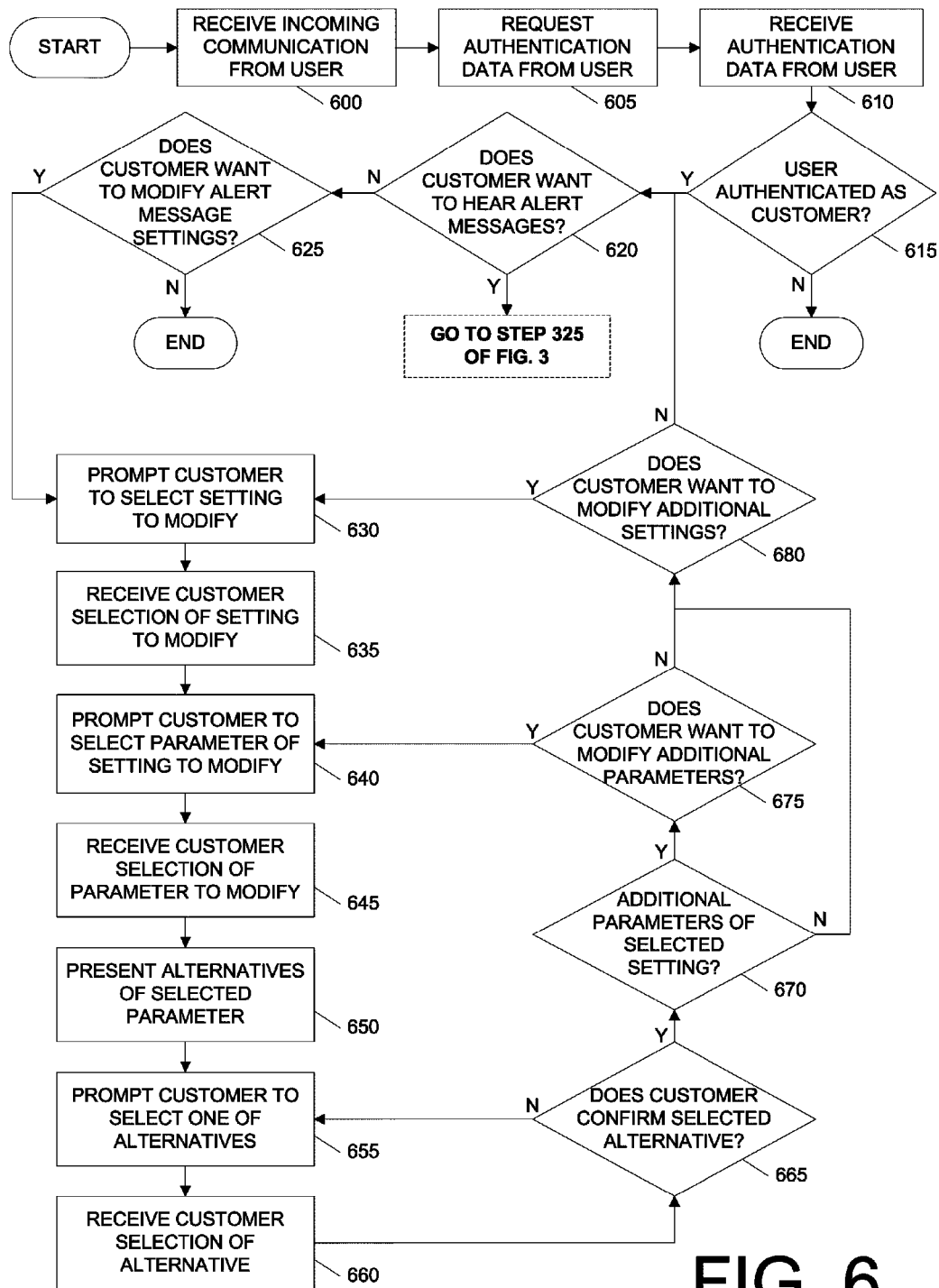
FIG. 6 is a flowchart illustrating an example method for modifying a customer's alert message settings according to one or more aspects described herein.

FIG. 6 illustrates an example method for modifying a customer's alert message settings according to one or more aspects described herein. Steps 600 thru 615 of the process may be carried out as described above with respect to steps 305 thru 320 in the example method for presenting a customer with alert messages illustrated in FIG. 3. Referring to FIG. 6, if, in step 615, the user is authenticated as a customer of the financial institution, then in step 620 the customer is queried as to whether the customer wants to hear alert messages. If the customer does want to hear alert messages, then the process continues at step 325 of the example method illustrated in FIG. 3. However, if in step 620 the customer does not want to hear alert messages, then in step 625 the customer may be queried about whether the customer wants to modify alert message settings. For example, with reference to FIG. 7, the alert message center may query the customer by issuing query 700 of "Would you like to modify your alert message settings?" Various alternative query formats may be used to query the customer about modifying alert message settings in step 625, and the language or phrasing of the query is in no way limited to that used in query 700 illustrated in FIG. 7. Additionally, as used herein, the term "settings" is not intended to be limiting to the description of the alert message settings aspect of the present disclosure. Thus, settings, as used in alert message settings, may alternatively be referred to as properties, conditions, preferences, attributes, characteristics, features, and the like.

Figure 7:
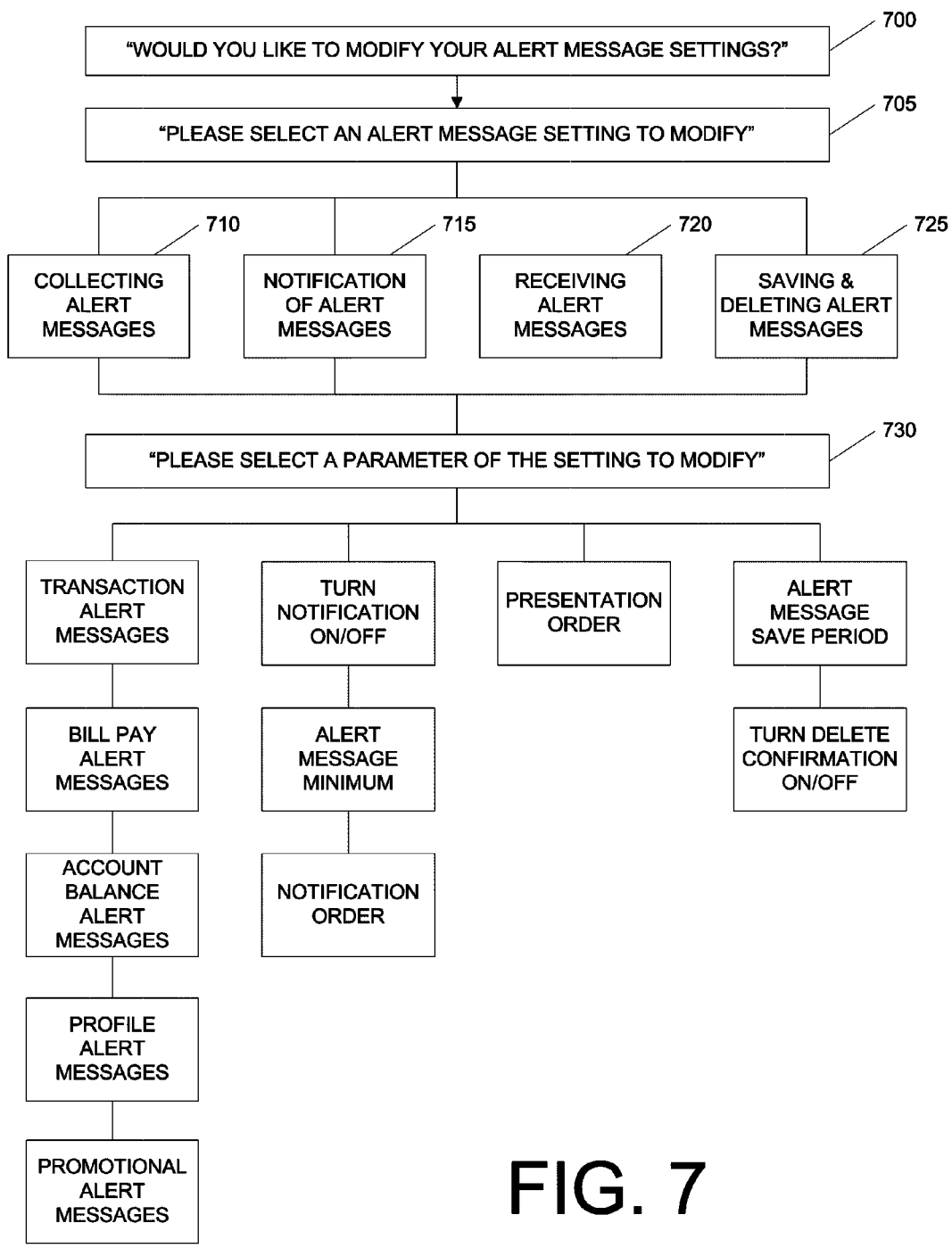
FIG. 7 illustrates an example menu structure for modifying a customer's alert message settings according to one or more aspects described herein.

If it is determined in step 625 that the customer does want to modify alert message settings, then in step 630 the customer is prompted to make a selection of an alert message setting to modify. For example, referring again to FIG. 7, the alert message center may present to the customer prompt 705 of "Please select an alert message setting to modify." As with query 700 issued to the customer in step 625, the prompt presented to the customer in step 630 may be in a variety of formats alternative to that used in query 705. There may be any number of alert message settings from which the customer may make a selection. For example, as illustrated in FIG. 7, the customer may select from collecting alert messages 710, notification of alert messages 715, receiving alert messages 720, and saving & deleting alert messages 725. Additional or alternative alert message settings may be made available for selection by the customer other than the illustrative examples shown in FIG. 7. In response to prompting the customer in step 630 to select an alert message setting to modify, in step 635 the alert message center may receive the customer's selection of a setting. If, for example, a customer wishes to set a minimum for the number of alert messages that must be collected by the alert message center before the customer receives a notification of alert messages, then the alert message center may receive from the customer a selection to modify the setting of notification of alert messages 715.

After receiving the customer's selection of an alert message setting, in step 640 the alert message center may prompt the customer to select a parameter of the setting that the customer wants to modify. Continuing with the previous example, if the customer selects to modify the notification of alert messages setting 715, the alert message center may prompt the customer to select from a turn notification on/off parameter, an alert message minimum parameter, and a notification order parameter. Any number of parameters in addition to, or instead of, the example parameters illustrated in FIG. 7 may be established for the various alert message settings presented to the customer in step 630. The number of parameters may vary across the available alert message settings of the alert message center. For example, an alert message setting that controls or affects a large number of aspects of the alert message center may have more corresponding parameters than an alert message setting that is associated with only one or two specific aspects of the alert message center. Similarly, an alert message setting associated with an aspect of the alert message center that customers tend to appreciate in a very uniform manner may have few corresponding parameters compared to a setting that is associated with an aspect of the alert message center that customers vastly differ in their attitude towards. In step 645, the alert message center may receive the customer's selection of a parameter of the selected alert message setting, and in response to receiving such, may present to the customer the alternatives of the parameter in step 650. The selected parameter may have only two alternatives for the customer to choose between, such as the turn notification on/off parameter of the notification of alert messages setting 715, or the parameter may have several corresponding alternatives, such as the alert message save period of the saving and deleting alert messages setting 725. As with parameters that may be associated with alert message settings, any number of alternatives may be associated with various parameters other than those described in the illustrative examples above. Furthermore, the number of alternatives may differ across the parameters made available to the customer for modification. In step 655, the alert message center may prompt the customer to select one of the alternatives presented to the customer in step 650.

In step 660, the alert message center may receive the customer's selection of one of the alternatives presented for the particular parameter, and in step 665 the customer may be queried to confirm the selection received by the alert message center in step 660. For example, if in step 660 the customer selects to turn notification of alert messages off, then in step 665 the alert message center may query the customer with "You have selected to turn off notification of alert messages. Is this selection correct?" If the customer confirms the alternative selected, then the process continues to step 670. However, if the selected alternative of the parameter is not what the customer intended or wanted, then the process reverts back to step 655 where the customer is again prompted to make a selection between the available alternatives for the parameter.

If, in step 665, the customer confirms the selected alternative, then in step 670 the alert message center determines whether additional parameters of the selected setting are available to the customer for modification other than the parameter selection received by the alert message center in step 645. In response to a determination that there are no additional parameters for the selected alert message setting, the process jumps to step 680 where the customer may receive a query from the alert message center as to whether the customer wants to continue modifying other alert message settings. If the customer does not want to modify any additional alert message settings, then the process may revert back to step 620 where the customer is again given the option of listening to alert messages. If the alert message center determines in step 670 that there exists additional parameters for the selected alert message setting, then in step 675 the customer may be queried about whether the customer wants to further modify the available parameters of the setting. If so, then the process reverts back to step 640 where the alert message center prompts the customer to make a selection of a parameter to modify, and repeats through either step 670, where it may be determined that there are no additional parameters of the setting, or through step 675 in which the customer may decide not to continue modifying any additional parameters that are identified by the alert message center.

Although specific examples of carrying out the aspects of the disclosure have been described, those skilled in the art will appreciate that there are numerous variations and permutations of the above-described systems and methods that are contained within the spirit and scope of the disclosure as set forth in the appended claims. Additionally, numerous other embodiments, modifications and variations within the scope and spirit of the appended claims will occur to persons of ordinary skill in the art from a review of this disclosure.

We claim:

1. A method comprising:
   receiving, at an alert message center of a financial institution, a communication from a telephonic device;
   requesting authentication data from a user of the telephonic device, wherein the authentication data identifies the user as a customer of the financial institution;
   in response to receiving the authentication data from the user, collecting a plurality of alert messages from one or more alert message engines of the financial institution;
   presenting to the user a notification of the alert messages collected;
   prompting the user to select whether to hear the alert messages;
   in response to receiving a request from the user to hear the alert messages, querying the user for a selection of an alert message to hear from the alert messages presented to the user in the notification; and
   in response to receiving from the user the selection of an alert message to hear, presenting the selected alert message to the user.

2. The method of claim 1, wherein presenting to the user a notification of the alert messages collected includes:
   indicating categories of alert messages with which the alert messages collected are associated; and
   indicating the number of alert messages collected for each indicated category of alert messages.

3. The method of claim 1, wherein querying the user for a selection of an alert message to hear from the alert messages presented to the user in the notification includes:
   requesting the user to select a category of alert messages with which the alert message to be heard is associated; and
   in response to receiving the selection of a category of alert messages from the user, prompting the user to select a particular alert message of the selected category of alert messages to be heard.

4. The method of claim 1, wherein collecting alert messages from a plurality of alert message engines includes:
   determining whether each of the alert messages collected from the plurality of alert message engines is stored in a database of the alert message center;
   in response to determining that each of the alert messages collected is stored in the database, adjusting alert message weights of the alert messages collected based on user alert message preference data;
   ordering the alert messages collected based on the adjusted alert message weights of the alert messages; and
   removing, from the alert messages collected from the plurality of alert message engines, alert messages with alert message weights failing to meet an alert message weight threshold.

5. The method of claim 4, further comprising:
   in response to determining that an alert message of the alert messages collected from the plurality of alert message engines is not stored in the database of the alert message center, adding the alert message to the database;

calculating an alert message weight for the alert message added to the database; and storing the calculated alert message weight with the corresponding alert message in the database.

6. The method of claim 5, wherein calculating an alert message weight for the alert message added to the database includes:

determining a first preference weight for the alert message added to the database;

determining a second preference weight for the alert message added to the database; and generating a third preference weight from combining the first preference weight and the second preference weight.

7. The method of claim 1, further comprising generating user alert message preference data based on activity within the alert message center.

8. The method of claim 7, wherein activity within the alert message center includes at least one of:

receiving from the user a selection of the alert message to hear from the alert messages presented to the user in the notification; and receiving from the user an indication to not hear the alert message from the alert messages presented to the user in the notification.

9. The method of claim 7, wherein generating user alert message preference data includes:

assigning a first value to the alert message when receiving user input to hear the alert message from the alert messages presented to the user in the notification;

assigning a second value to the alert message when receiving user input declining to hear the alert message from the alert messages presented to the user in the notification;

tracking occurrences of the user selecting to hear and declining to the alert message;

calculating a third value based on the tracked occurrences of the user, the assigned first value, and the assigned second value; and adjusting a weight of the alert message according to the third value.

10. The method of claim 1, further comprising:

in response to not receiving a request from the user to hear the alert messages, prompting the user to select whether to modify alert message settings used by the alert message center;

in response to receiving a request from the user to modify the alert message settings, prompting the user for a modification of the alert message settings; and receiving the modification of the alert message settings from the user.

11. The method of claim 10, wherein prompting the user for a modification of the alert message settings includes:

prompting the user for a selection of an alert message setting;

in response to receiving the selection of the alert message setting, presenting to the user parameters of the alert message setting;

prompting the user for a selection of a parameter of the parameters presented to the user;

in response to receiving the selection of the parameter, presenting to the user a plurality of alternative parameters; and prompting the user for a selection of an alternative parameter of the plurality of alternative parameters.

12. A computer-readable storage medium storing computer-executable instructions that, when executed, cause a processor to perform a method comprising:

receiving, at an alert message center of a financial institution, a communication from a telephonic device;

requesting authentication data from a user of the telephonic device, wherein the authentication data authorizes the user to communicate with the alert message center;

in response to receiving the authentication data from the user, collecting alert messages from a plurality of alert message engines of the financial institution;

presenting to the user a notification of the alert messages collected;

prompting the user to select whether to hear the alert messages;

in response to receiving a request from the user to hear the alert messages, querying the user for a selection of an alert message to hear from the alert messages presented to the user in the notification;

in response to receiving the selection of an alert message from the user, presenting the selected alert message to the user;

in response to not receiving a request from the user to hear the alert messages, prompting the user to select whether to modify alert message settings used by the alert message center in collecting the plurality of alert messages;

in response to receiving a request from the user to modify the alert message settings, prompting the user for a modification of the alert message settings; and receiving the modification of the alert message settings from the user.

13. The computer-readable medium of claim 12, said method further comprising:

indicating categories of alert messages with which the alert messages collected are associated; and indicating the number of alert messages collected for each indicated category of alert messages.

14. The computer-readable medium of claim 12, said method further comprising:

requesting the user to select a category of alert messages with which the alert message to be heard is associated; and in response to receiving the selection of a category of alert messages from the user, prompting the user to select a particular alert message of the selected category of alert messages to be heard.

15. The computer-readable medium of claim 12, said method further comprising:

determining whether each of the alert messages collected from the plurality of alert message engines is stored in a database of the alert message center;

in response to determining that each of the alert messages collected is stored in the database, adjusting alert message weights of the alert messages collected based on user alert message preference data;

ordering the alert messages collected based on the adjusted alert message weights of the alert messages; and removing, from the alert messages collected from the plurality of alert message engines, alert messages with alert message weights failing to meet an alert message weight threshold.

16. The computer-readable medium of claim 15, said method further comprising:

in response to determining that an alert message of the alert messages collected from the plurality of alert message engines is not stored in the database of the alert message center, adding the alert message to the database;

calculating an alert message weight for the alert message added to the database; and storing the calculated alert message weight with the corresponding alert message in the database.

17. The computer-readable medium of claim 16, said method further comprising:

determining a first preference weight for the alert message added to the database;

determining a second preference weight for the alert message added to the database; and generating a third preference weight from combining the first preference weight and the second preference weight.

18. The computer-readable medium of claim 12, said method further comprising generating user alert message preference data based on activity within the alert message center.

19. The computer-readable medium of claim 18, wherein activity within the alert message center includes at least one of:

receiving from the user a selection of the alert message to hear from the alert messages presented to the user in the notification; and receiving from the user an indication to not hear the alert message from the alert messages presented to the user in the notification.

20. The computer-readable medium of claim 18, said method further comprising:

assigning a first value to the alert message when receiving user input to hear the alert message from the alert messages presented to the user in the notification;

assigning a second value to the alert message when receiving user input declining to hear the alert message from the alert messages presented to the user in the notification;

tracking occurrences of the user selecting to hear and declining to the alert message;

calculating a third value based on the tracked occurrences of the user, the assigned first value, and the assigned second value; and adjusting a weight of the alert message according to the third value.

21. The computer-readable medium of claim 12, said method further comprising:

prompting the user for a selection of an alert message setting;

in response to receiving the selection of the alert message setting, presenting to the user parameters of the alert message setting;

prompting the user for a selection of a parameter of the parameters presented to the user;

in response to receiving the selection of the parameter, presenting to the user a plurality of alternative parameters; and prompting the user for a selection of an alternative parameter of the plurality of alternative parameters.

22. An apparatus comprising:

a memory; and a processor coupled to the memory and configured to perform, based on instructions stored in the memory:

receiving, at an alert message center of a financial institution, a communication from a telephonic device;

requesting authentication data from a user of the telephonic device, wherein the authentication data identifies the user as a customer of the financial institution;

in response to receiving the authentication data from the user, collecting alert messages from a plurality of alert message engines of the financial institution;

presenting to the user a notification of the alert messages collected;

prompting the user to select whether to hear the alert messages;

in response to receiving a request from the user to hear the alert messages, querying the user for a selection of an alert message to hear from the alert messages presented to the user in the notification;

in response to receiving the selection of an alert message from the user, presenting the selected alert message to the user;

in response to not receiving a request from the user to hear the alert messages, prompting the user to select whether to modify alert message settings used by the alert message center in collecting the plurality of alert messages;

in response to receiving a request from the user to modify the alert message settings, prompting the user for a modification of the alert message settings; and receiving the modification of the alert message settings from the user.

23. The apparatus of claim 22, wherein the processor is further configured to perform:

indicating categories of alert messages with which the alert messages collected are associated; and indicating the number of alert messages collected for each indicated category of alert messages.

24. The apparatus of claim 22, wherein the processor is further configured to perform:

requesting the user to select a category of alert messages with which the alert message to be heard is associated; and in response to receiving the selection of a category of alert messages from the user, prompting the user to select a particular alert message of the selected category of alert messages to be heard.

25. The apparatus of claim 22, wherein the processor is further configured to perform:

determining whether each of the alert messages collected from the plurality of alert message engines is stored in a database of the alert message center;

in response to determining that each of the alert messages collected is stored in the database, adjusting alert message weights of the alert messages collected based on user alert message preference data;

ordering the alert messages collected based on the adjusted alert message weights of the alert messages; and removing, from the alert messages collected from the plurality of alert message engines, alert messages with alert message weights failing to meet an alert message weight threshold.

26. The apparatus of claim 22, wherein the processor is further configured to perform:

prompting the user for a selection of an alert message setting;

in response to receiving the selection of the alert message setting, presenting to the user parameters of the alert message setting;

prompting the user for a selection of a parameter of the parameters presented to the user;

in response to receiving the selection of the parameter, presenting to the user a plurality of alternative parameters; and prompting the user for a selection of an alternative parameter of the plurality of alternative parameters.

27. A computer-assisted method comprising:

receiving, at an alert message center of a financial institution, a communication from a telephonic device;

requesting authentication data from a user of the telephonic device, wherein the authentication data identifies the user as a customer of the financial institution;

in response to receiving the authentication data from the user, collecting alert messages from a plurality of alert message engines of the financial institution;

presenting to the user a notification of the alert messages collected;

prompting the user to select whether to hear the alert messages;

in response to receiving a request from the user to hear the alert messages, querying the user for a selection of an alert message to hear from the alert messages presented to the user in the notification;

in response to receiving the selection of an alert message from the user, presenting the selected alert message to the user;

in response to not receiving a request from the user to hear the alert messages, prompting the user to select whether to modify alert message settings used by the alert message center in collecting the plurality of alert messages;

in response to receiving a request from the user to modify the alert message settings, prompting the user for a modification of the alert message settings; and receiving the modification of the alert message settings from the user.

* * * * *